(12) United States Patent
Watanabe et al.

(10) Patent No.: US 7,249,150 B1
(45) Date of Patent: Jul. 24, 2007

(54) SYSTEM AND METHOD FOR PARALLELIZED REPLAY OF AN NVRAM LOG IN A STORAGE APPLIANCE

(75) Inventors: Steven S. Watanabe, San Jose, CA (US); John K. Edwards, Sunnyvale, CA (US); Blake H. Lewis, Palo Alto, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 252 days.

(21) Appl. No.: 09/898,894

(22) Filed: Jul. 3, 2001

(51) Int. Cl.
*G06F 17/30* (2006.01)
(52) U.S. Cl. ...................................... 707/200
(58) Field of Classification Search ................ 707/204, 707/1, 2, 10, 202, 200; 711/112; 714/20, 714/4
See application file for complete search history.

(56) References Cited

U.S. PATENT DOCUMENTS

| | | | | |
|---|---|---|---|---|
| 5,440,726 A * | 8/1995 | Fuchs et al. | ................... | 714/20 |
| 5,588,117 A * | 12/1996 | Karp et al. | ................... | 709/232 |
| 5,819,292 A | 10/1998 | Hitz et al. | ................... | 707/203 |
| 5,948,110 A | 9/1999 | Hitz et al. | ...................... | 714/6 |
| 5,950,225 A | 9/1999 | Kleiman | ...................... | 711/111 |
| 5,963,962 A | 10/1999 | Hitz et al. | ................... | 707/202 |
| 6,038,570 A | 3/2000 | Hitz et al. | ................... | 707/204 |
| 6,119,244 A | 9/2000 | Schoenthal et al. | ............ | 714/4 |
| 6,128,762 A * | 10/2000 | Jadav et al. | ................ | 714/766 |
| 6,138,126 A | 10/2000 | Hitz et al. | ................... | 707/202 |
| 6,330,570 B1 * | 12/2001 | Crighton | ..................... | 707/204 |
| 6,671,820 B1 * | 12/2003 | Kelman | .......................... | 714/4 |
| 2003/0131190 A1 * | 7/2003 | Park et al. | ................... | 711/112 |

\* cited by examiner

*Primary Examiner*—Etienne LeRoux
(74) *Attorney, Agent, or Firm*—Cesari & McKenna, LLP

(57) ABSTRACT

A system and method for enabling parallel replay of a backup memory log of client transaction request entries to a network storage appliance file system is provided. The backup memory is typically implemented as a non-volatile random access memory (NVRAM). An initiator establishes a swarm of messages with a plurality of transaction blocks pointing to logged request entries and related states associated therewith. The states represent the various phases of file system recovery and disk storage including a retrieval of disk information (data and meta-data), typically in the form of a LOAD, and a subsequent modify phase. The swarm is transferred to the file system for parallel disk information-retrieval in an interleaved process. Any transactions that cannot be performed due to a required prerequisite action (e.g. a prior file-create) are returned to the initiator for reloading once the prerequisite action has occurred.

10 Claims, 6 Drawing Sheets

SYSTEM AND METHOD FOR PARALLELIZED REPLAY OF AN NVRAM LOG IN A STORAGE APPLIANCE

FIELD OF THE INVENTION

The present invention relates to file systems for network storage architectures, and more particularly, to a backup memory log in a network storage appliance.

BACKGROUND OF THE INVENTION

A network storage appliance is a special-purpose computer that provides file service relating to the organization of information on storage devices, such as disks. The network storage appliance or filer includes an operating system that implements a file system to logically organize the information as a hierarchical structure of directories and files on the disks. Each "on-disk" file may be implemented as set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume is an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented as a microkernel within the overall protocol stack of the filer and associated disk storage. This microkernel is supplied as part of Network Appliance's Data ONTAP™ software, residing on the filer, that processes file-service requests from network-attached clients.

The disk storage is typically implemented as one or more storage "volumes" that comprise a cluster of physical storage disks, defining an overall logical arrangement of storage space. Currently available filer implementations can serve a large number of discrete volumes (150 or more, for example). Each volume is generally associated with its own file system (WAFL for example). The disks within a volume/file system are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL-based file system and process, a RAID 4 implementation is advantageously employed. This implementation specifically entails the striping of data across a group of disks, and separate parity caching within a selected disk of the RAID group.

The exemplary filer may be made more reliable and stable in the event of a system shutdown or other unforeseen problem by employing a backup memory consisting of a non-volatile random access memory NVRAM as part of its architecture. An NVRAM is typically a large-volume solid-state memory array (RAM) having either a back-up battery, or other built-in last-state-retention capabilities (e.g. a FLASH memory), that holds the last state of the memory in the event of any power loss to the array.

As a client transaction request is completed by WAFL, that request is logged to the NVRAM as a journal entry. Such entries for a given File can include, for example, "Create File," "Write File Data," "Open File," etc. Widely accepted file system standards, such as Network File System (NFS), specify that a file server should not reply to a requesting client until the results of a given request are written out to stable storage. Note that the results of the request, including associated file meta-data that would likely be changed by the request are not logged to NVRAM in accordance with this arrangement. This reduces the required storage space for the NVRAM while retaining critical information for possible replay. By writing to NVRAM, this requirement is met, and a reply can be returned to the requesting client with respect to the transaction before the results of the request have been written to a disk. The NVRAM is loaded with requests until such time as a consistency point (CP) is reached. CPs occur at fixed time intervals, or when other key events arise. Each time a CP occurs, the requests logged in the NVRAM are subsequently overwritten (after NVRAM log's entry count is reset to zero), as the results of the requests are written from the filer's conventional RAM buffer cache to disk. This is because once a root inode is written from cache to the disk, then the logged data in the NVRAM is no longer needed, and it may be overwritten or otherwise cleared. Immediately thereafter, the NVRAM is reloaded with new requests. The process continues as each CP occurs, at which time the entry count of the NVRAM log is reset (allowing overwrite), and cached results of client requests are transferred to disk.

However, in the event of an unexpected shutdown, power failure or other system problem, which interrupts the normal flow of information between the client, WAFL and the disks, the NVRAM must be called upon to recover information logged between the last CP to the interruption event, and that information must be replayed to Data ONTAP/WAFL so as to reconstruct the last transactions before interruption. In general, the replay process occurs in seriatim, with each logged request replayed in turn (in the order it exists in the NVRAM log), until the log has been fully replayed. During this time normal filer processes are suspended and affected volumes are inaccessible.

The processing of each NVRAM log entry requires WAFL to complete multiple phases, characterized generally by "LOAD," "LOCK," "MODIFY," and "RESIZE," before logged data is finally written to disk (via the filer's buffer cache memory). Note that LOAD and MODIFY are required phases for every message. In particular, the LOAD phase requires loading of file system data (inodes) from the disk into filer memory, and consumes substantial computing resources/time. Thereafter, the LOCK (if applicable), MODIFY and RESIZE (if applicable) phases are entered in sequence. During the MODIFY phase, the subject file and associated meta-data are modified in filer memory. The MODIFY phase must occur in the exact order, with respect to other NVRAM log entries, as it had before the interruption. This procedure contrasts directly with normal filer runtime in which LOAD transactions are overlapped as concurrent access to multiple disks on the write-anywhere disk volume set occurs. As such, a normal runtime operation, which might consume a tenth or hundredth of a second of time, may last tens or hundreds of seconds in replay. In addition, where the transparent failover feature of the Common Internet File System (CIFS) protocol is employed, a client time-out will occur if a server fails to respond within forty-five seconds. If the server is inaccessible for more than forty-five seconds, then a desired transparent failover cannot occur. Hence, forty-five seconds may become a hard time limit within which normal server transactions must be reactivated, and this makes rapid replay of the NVRAM log even more desirable.

It is, therefore, an object of this invention to provide a more efficient technique for replaying an NVRAM log following system interruption that reduces the overall processing time for logged transactions, and therefore, speeds the restart of normal filer operations after an interruption.

SUMMARY OF THE INVENTION

This invention overcomes the disadvantages of the prior art by providing a technique for transferring a group of client transaction request entries each containing a separate client request entry from the NVRAM log to the file system as a swarm of messages with respect to the transaction request entries, for parallel processing by the file system. Those transactions that are not capable of being processed in the transmitted message swarm (e.g. a "write" file), because they require a prior prerequisite transaction (e.g. a "create" file) to occur first, are returned with an error notation to process the returned transaction at a later time, while other transactions are processed in a given order. Returned transactions are reprocessed once the required earlier process has occurred.

In general, a given swarm LOAD phase (generally, a disk information retrieval process in which meta-data and data from the disk in connection with given file are loaded to filer memory) is carried out and completed concurrently (in parallel), and the respective MODIFY phases therefor are then synchronized in the correct order with respect to the original NVRAM log entries. In other words, each LOAD process (or comparable file system operation) typically involves various steps to be performed by the file system—the swarm of messages have the steps performed by a given processor in the filer in a somewhat arbitrary order, allowing a plurality of swarm messages to be "worked-on" by the file system concurrently (in parallel via an interleaving of processes). As each swarm transaction is completed (e.g. a MODIFY is complete), the transaction's state is changed to indicate that a related later transaction may now occur.

According to a preferred embodiment, a set of 200 (or another number) transaction blocks having pointers to associated NVRAM log entries, based upon the 200-message swarm, and current file system state information are established by the initiator process. The initial state is set to "NEW." The blocks are transferred to the file system (WAFL) and the transactions are processed in their LOAD phase concurrently (in parallel) without particular regard to the original log order. Transactions that are processed are returned to the initiator and set to the state, "LOADED." Entries that are not capable of being processed, due to a required prerequisite transaction, are returned with an error notation, and set to the state "LOAD RETRY." Transactions are then retransferred to the file system in the order in which they originally were logged for subsequent phases including a required "MODIFY" phase. When the various prerequisite transactions for each LOAD RETRY transaction has been processed, the LOAD RETRY is then retransferred to the file system for processing. Each processed block is eventually marked "MODIFIED" by the initiator. Once all transactions in the swarm have been processed (e.g. MODIFIED), the next swarm (if any) is established by the initiator and the procedure repeats until all transactions have been processed from the NVRAM log. Commitment of the results of the transaction request entries to disk occurs at the end of log replay—and after the requisite number of swarms have been processed to thereby empty the log.

If a LOAD RETRY transaction cannot be processed upon return to the file system (when prerequisite transactions have supposedly been satisfied), or if the first message is a LOAD RETRY, then a panic condition is created, as a file system error is present. A flag may be set that causes the log to be transferred in a conventional sequential manner upon system reboot so as to possibly avoid the file system error the next time.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
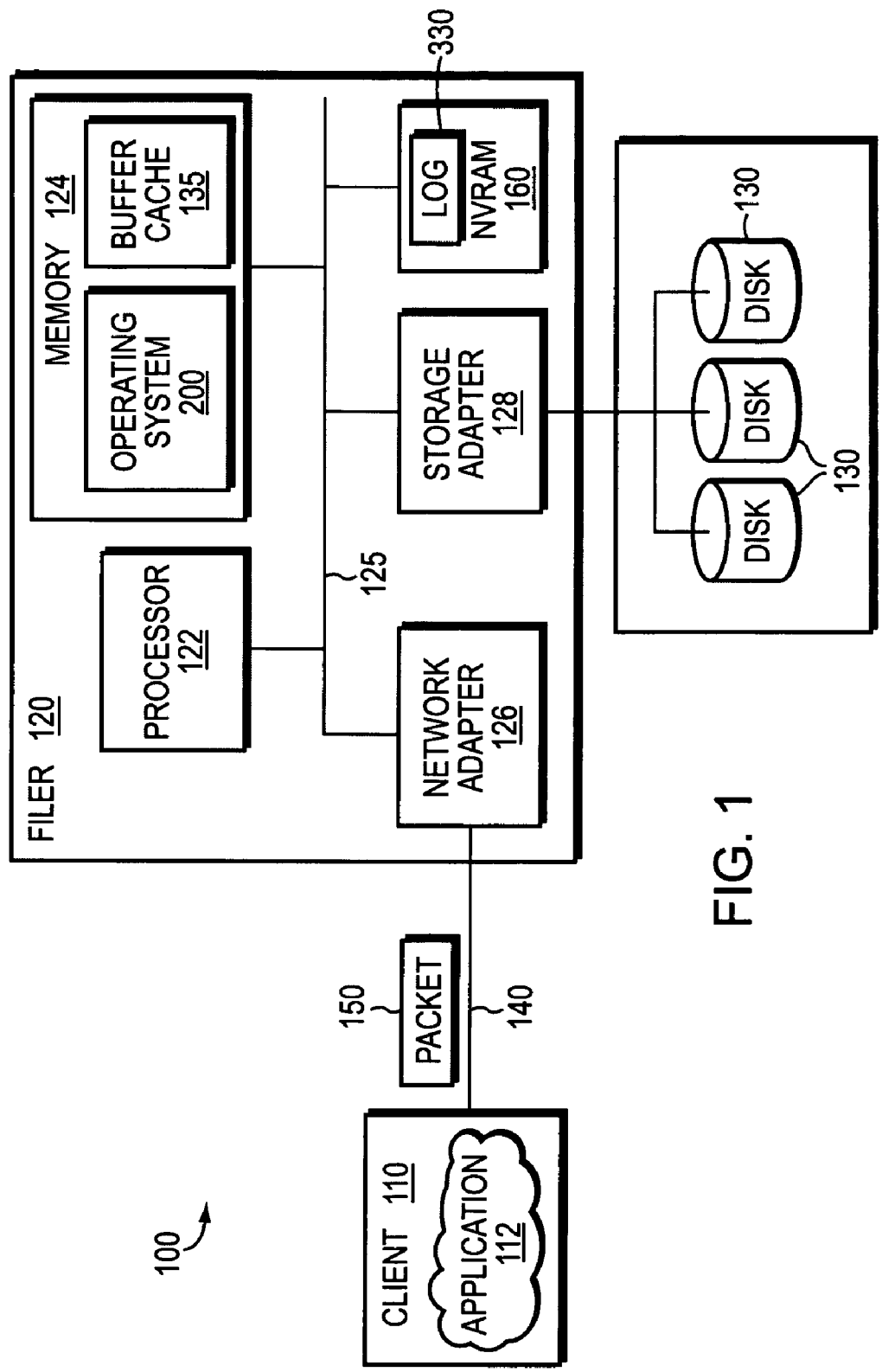
FIG. 1 is a schematic block diagram of a network environment including a network storage appliance that may be advantageously used with the present invention.

FIG. 1 is a schematic block diagram of an environment 100 that includes a network storage appliance that may be advantageously used with the present invention. The network storage appliance or filer 120 is a special-purpose computer that provides file service relating to the organization of information on storage devices, such as disks 130. It will be understood to those skilled in the art that the inventive technique described herein may apply to any type of special-purpose (e.g., server) or general-purpose computer, including a standalone computer. The filer 120 comprises a processor 122, a memory 124, a network adapter 126 and a storage adapter 128 interconnected by a system bus 125. The filer 120 also includes an operating system 200 that implements a file system to logically organize the information as a hierarchical structure of directories and files on the disks.

In the illustrative embodiment, the memory 124 comprises storage locations that are addressable by the processor and adapters for storing software program code. A portion of the memory may be further organized as a "buffer cache" 135 for storing data structures that are passed between disks and the network during normal runtime operation. The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a database application. Moreover, the client 110 may interact with the filer 120 in accordance with a client/server model of information delivery. That is, the client may request the services of the filer, and the filer may return the results of the services requested by the client, by exchanging packets 150 encapsulating, e.g., the CIFS protocol or NFS protocol format over the network 140.

The storage adapter 128 cooperates with the operating system 200 executing on the filer to access information requested by the client. The information may be stored on the disks 130. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

Notably, the Filer 120 includes an NVRAM 160 that provides fault-tolerant backup of data, enabling the integrity of filer transactions to survive a service interruption based upon a power failure, or other fault. The size of the NVRAM is variable. It is typically sized sufficiently to log a certain time-based chunk of transactions (for example, several seconds worth). The NVRAM is filled, in parallel with the buffer cache, after each client request is completed (e.g. LOAD . . . MODIFY accomplished), but before the result of the request is returned to the requesting client.

To facilitate access to the disks 130, the operating system 200 implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the operating system is preferably the NetApp® Data ONTAP™ operating system available from Network Appliance, Inc., Sunnyvale, Calif. that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Figure 2:
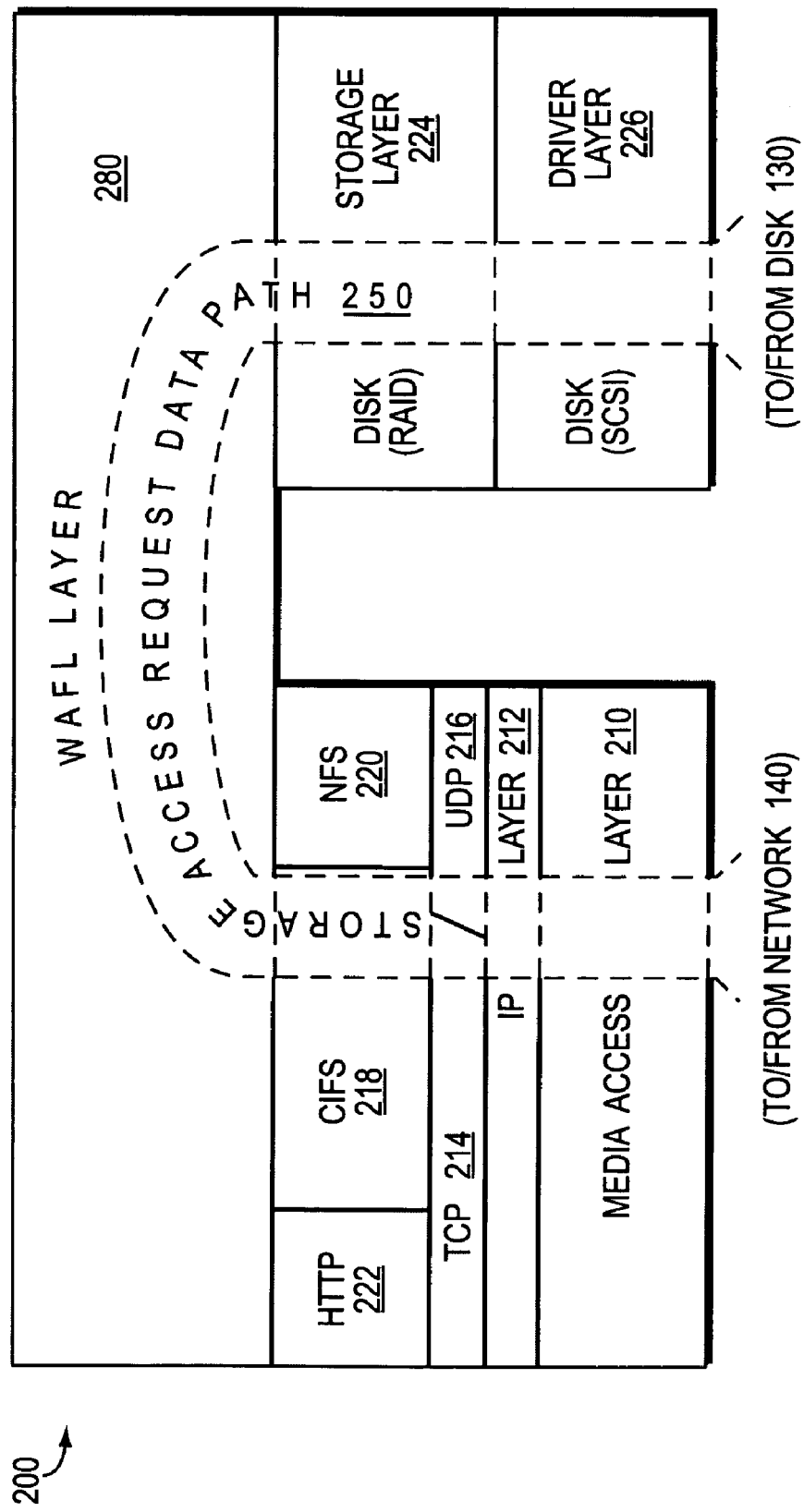
FIG. 2 is a schematic block diagram of an operating system including a write-anywhere file layout (WAFL) file system layer that may be advantageously used with the present invention.

FIG. 2 is a schematic block diagram of the Data ONTAP operating system 200 that may be advantageously used with the present invention. The operating system comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the operating system 200 includes a disk storage layer 224 that implements a disk storage protocol, such as a RAID protocol, and a disk driver layer 226 that implements a disk access protocol such as, e.g., a Small Computer Systems Interface (SCSI) protocol.

Bridging the disk software layers with the network and file system protocol layers is a WAFL layer 280 that preferably implements the WAFL file system. The on-disk format representation of the WAFL file system is block-based using, e.g., 4-kilobyte (KB) blocks and using inodes to describe the files. The WAFL file system uses files to store meta-data describing the layout of its file system; these meta-data files include, among others, an inode file. A file handle, i.e., an identifier that includes an inode number, is used to retrieve an inode from disk.

Broadly stated, all inodes of the WAFL file system are organized into the inode file. A file system (FS) info block specifies the layout of information in the file system and includes an inode of a file that includes all other inodes of the file system. Each volume (file system) has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as, e.g., a conventional CIFS or NFS protocol packet 150 over the computer network 140 and onto the filer 120 where it is received at the network adapter 126. A network driver of the media access layer 210 processes the packet, passes it onto the network protocol layers 212-216 and CIFS or NFS layer 218, 220 for additional processing prior to forwarding to the WAFL layer 280. Here, the WAFL file system generates operations to "load" (retrieve) the requested data from disk 130 if it is not resident "incore," i.e., in the buffer cache 135. If the information is not in the cache, the WAFL layer 280 indexes into the inode file using the inode number to access an appropriate entry and retrieve a logical volume block number (VBN). The WAFL layer then passes the logical VBN to the disk storage (RAID) layer 224, which maps that logical number to a disk block number and sends the latter to an appropriate driver (e.g., SCSI) of the disk driver layer 226. The disk driver accesses the disk block number from disk 130 and loads the requested data block(s) in buffer cache 135 for processing by the filer. Upon completion of the request, the filer (and operating system) returns a reply to the client 110 over the network 140.

It should be noted that the software "path" through the operating system layers described above needed to perform data storage access for the client request received at the filer may alternatively be implemented in hardware. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110.

Figure 3:
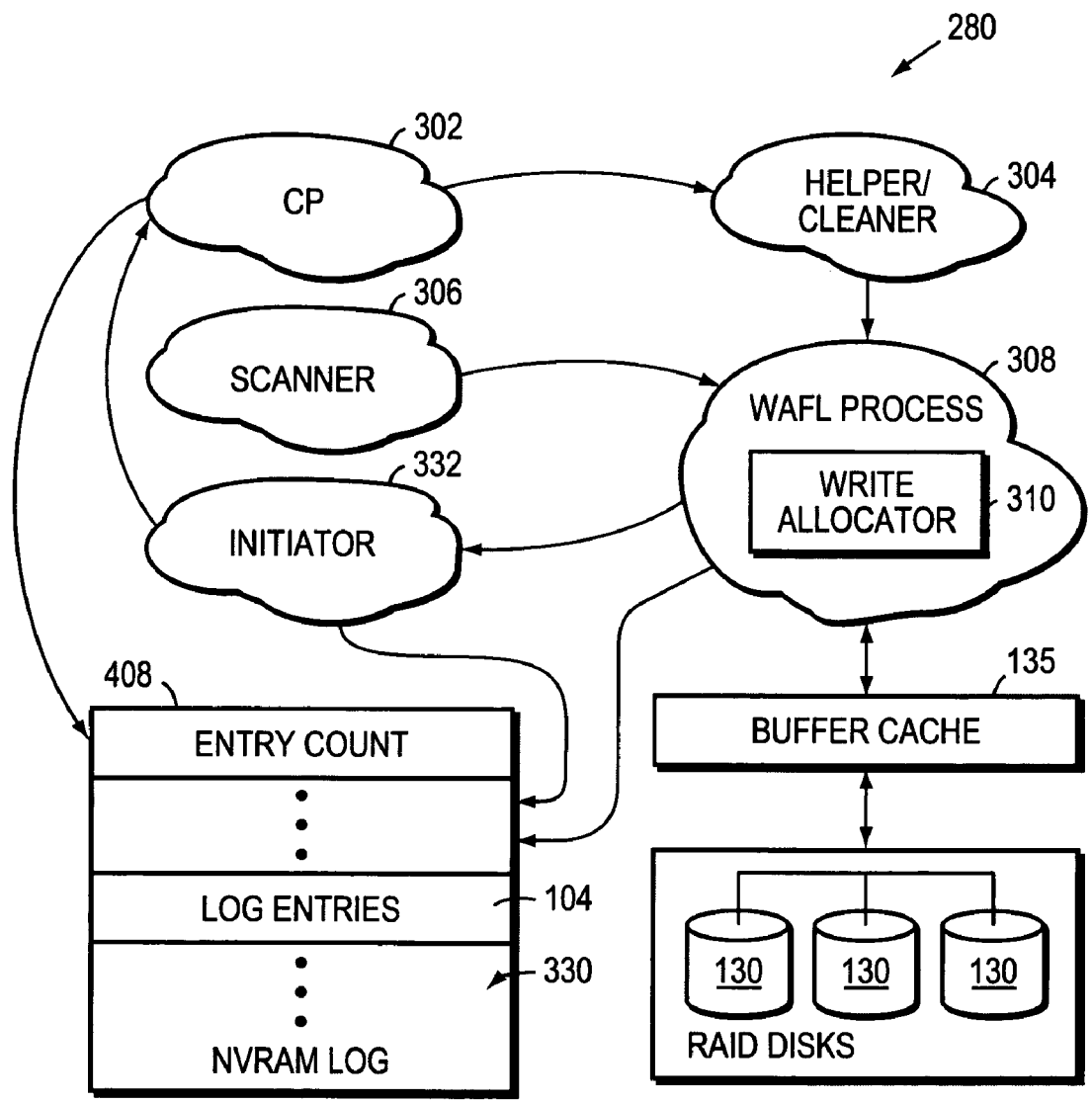
FIG. 3 is a schematic block diagram illustrating the various processes within the WAFL layer.

Various processes within the WAFL layer 280 cooperate to service a client request "incore" and thereafter "dirty" the appropriate inodes and blocks prior to storing (writing) them to disks. FIG. 3 is a schematic block diagram illustrating the various processes within the WAFL layer 280 of the operating system 200. These processes include a consistency point (CP) process 302, a helper/cleaner process 304, a scanner process 306 and a WAFL process 308. In general, the WAFL process 308 performs the basic work in the WAFL layer, e.g., loading blocks into the buffer cache 135, etc. The scanner, CP and helper/cleaner processes are essentially administrative processes that manage the work performed by the WAFL process. To that end, the administrative processes send messages to the WAFL process 308, instructing that process to execute particular functions with particular data supplied by the administrative processes. The WAFL process then processes/manipulates the data structures in the buffer cache and sends messages to the RAID layer 224 for purposes of loading/storing data on disks.

The WAFL process 308 logs to the NVRAM 330, described briefly above. The NVRAM log contains a series of ordered entries 104 corresponding to discrete client messages requesting file transactions such as "write," "create," "open," and the like. These entries are logged in the particular order completed. In other words, each request is logged to the NVRAM log at the time of completion—when the results of the requests are about to be returned to the client.

The CP process 302 manages write allocation operations of the file system, whereas the helper/cleaner process 304 manages "cleaning" of the buffer cache 135. These processes cooperate to provide dirtied blocks from the cache 135 to a write allocator 310 of the WAFL process. The write allocator 310 interacts with the RAID layer to obtain information about the layout of the disks. In addition, the write allocator interacts with other processes of the WAFL layer 280, including the scanner 306, to obtain information relating to the optimal order of which data for files should be written to the disks. The write allocator 310 then writes the data to disk, one file at a time, in accordance with a write allocation algorithm. To invoke write allocation, the helper/cleaner process 304 sends a message to the WAFL process 308 requesting a write allocation function for a particular structure (e.g., inode).

It should be noted that all write operations in the file system are performed to "free space" blocks on disks. A free space block represents an available location (e.g., data block) on disk that is not currently used to store valid information. When storing a file to disk, the write allocator 310 of the WAFL layer 280 writes into these free blocks at a write allocation point. The write allocator generally writes only a certain number of blocks to a given disk prior to moving to a next disk, so as to spread the data across multiple disks. Notably, the write allocator 310 writes the file data in generally the same area of the disk during a CP operation. The function of the scanner, helper/cleaner, write allocation and related processes are described in further detail in commonly assigned U.S. patent application Ser. No. 10/027,634, now issued as U.S. Pat. No. 6,978,283 on Nov. 20, 2005, entitled FILE SYSTEM DEFRAGMENTATION TECHNIQUE VIA WRITE ALLOCATION by John Edwards, et al, the teachings of which are expressly incorporated herein by reference. Note that certain of these processes can be changed or omitted without affecting the system and method of the present invention.

As described above, CP operations occur at specific time intervals, when a certain level of storage has been accumulated, or when a particular event occurs. At such times, the results of the requests (e.g. data and meta-data) accumulated in the NVRAM log 330 are written to disk, thereby completing the consistency point. Prior to such completion, any system interruption, power loss, or failure is recoverable through replay of the log from the previous consistency point. Since the NVRAM is constructed to survive power failures and other mishaps, the contents of the log are appropriately protected. These logs are retrieved during the replay process to be described.

An initiator process 332 is employed specifically during a replay of the NVRAM log 330 as a result of a service interruption. The initiator process 332 is responsible for transfer of the contents of the log 330 to WAFL, for subsequent write to the disk. In conjunction with replay, the initiator process 332 interacts with the CP process 302 to instruct a CP process to occur.

Figure 4:
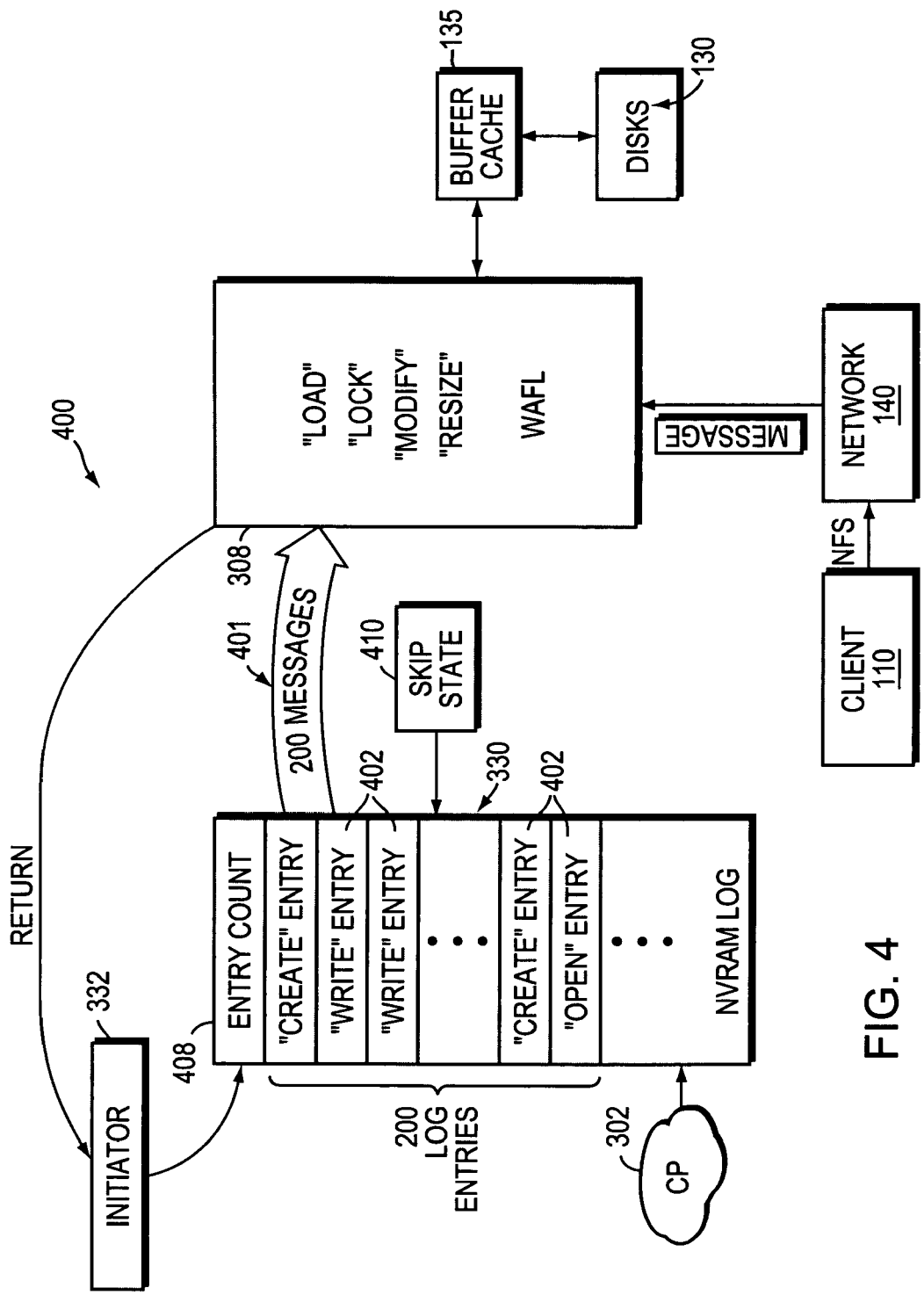
FIG. 4 is a schematic block diagram illustrating the establishment and transfer of a swarm of messages from the NVRAM to WAFL.

Reference is now made to FIG. 4, which illustrates the generalized process 400 for transferring messages during an NVRAM log replay. The NVRAM log 330 is adapted to transfer a "swarm" of messages 401 in a parallel operation based upon its log entries 402. In other words, the initiator 332 groups a predetermined number of messages 401 (a 200-message swarm in this example) into the swarm that corresponds to 200 NVRAM log entries 402. The log of this embodiment also includes an entry count header 408 that tracks the number and location of stored requests in the NVRAM. Note that a skip state 510 is also provided to account for a disk volume that no longer is accessible following a system failure or other event. Messages destined for such a volume may be skipped, and handled by a different aspect of the file system.

When a swarm is established, it is passed as a single group from the initiator process 332 to the WAFL process 308 upon replay. WAFL then processes these messages in a somewhat arbitrary order as part of the overall swarm. This differs from the prior art process in which messages are passed over in a particular sequence until the log is emptied. As discussed above, the WAFL process enters at least one of a LOAD, LOCK, MODIFY and RESIZE phase with respect to each message. It is recognized that, in most instances, the majority of messages will be able to occur without any preceding transaction message. Such messages can be carried out without regard to any preceding message. Accordingly, the replay of a swarm of 200 messages results, statistically, in a rapid succession of LOAD and MODIFY operations. However, certain messages do, in fact, require a preceding action to occur. In particular, a write to a file cannot occur before the file is created.

Figure 5:
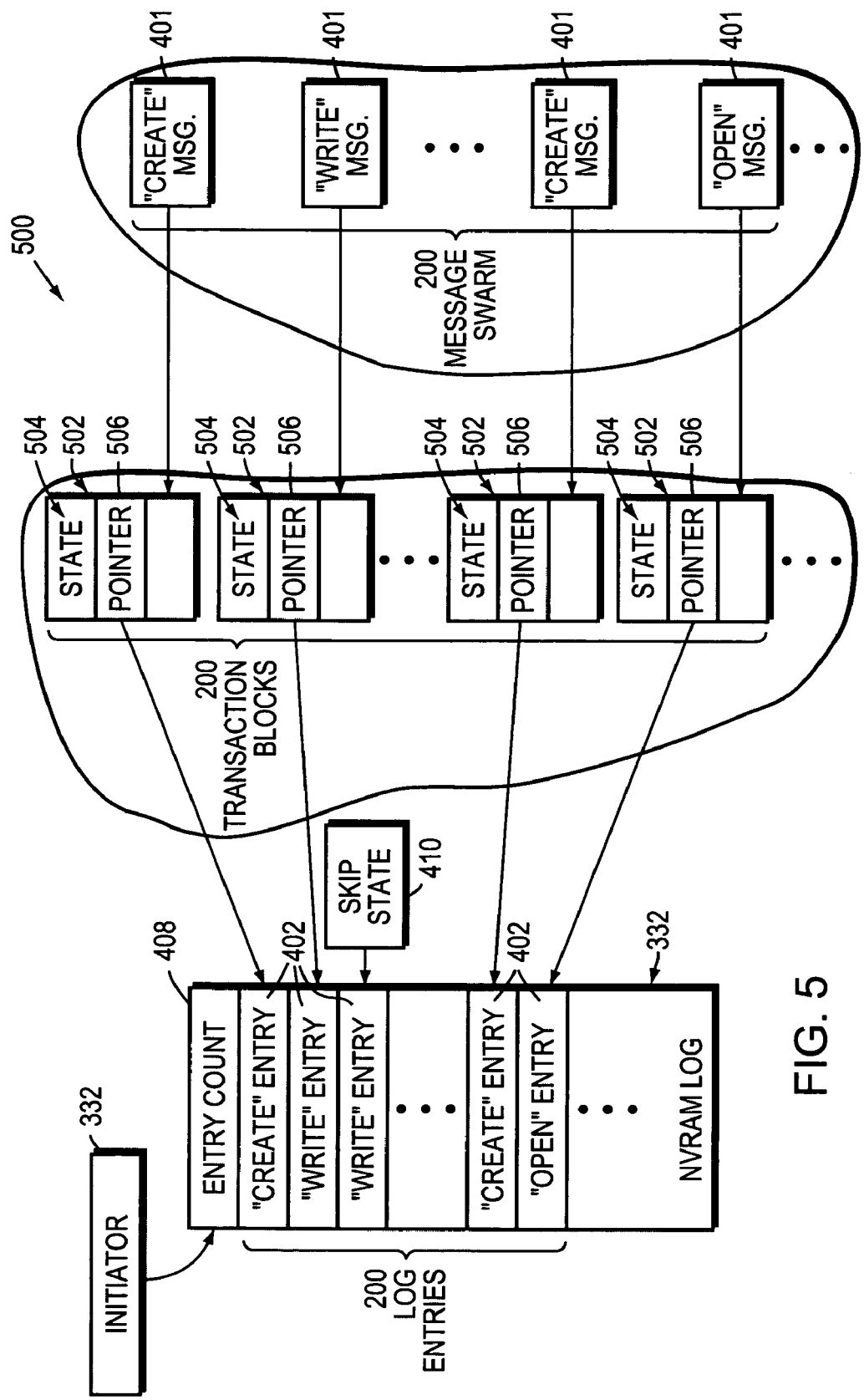
FIG. 5 is a schematic block diagram illustrating the creation of transaction block pointers for transfer to WAFL including prevailing state information.

Therefore, reference is made to FIG. 5, which schematically illustrates of a particular swarm implementation 500 according to a preferred embodiment. A sequence of exemplary messages 401 are shown. These are represented by certain standard actions including "Create" file, "Write" file, "Open" file, and the like. Typically, a "Create" file must precede a "Write" or "Open" of that file, requiring a given ordering of message processing to be observed. To support a procedure for ensuring that the proper processing order is maintained for a swarm, each message is initially provided by the initiator process with a logical "transaction block" 502. The transaction blocks each contain a state variable 504 and a pointer 506, each associated with a discrete message 401 of the swarm, and pointing to a discrete log entry 402 in the NVRAM log. The transaction blocks 502 are mapped one-to-one with each message. In this example, a swarm of 200 messages 401, corresponding to 200 transaction blocks 504 are grouped. This number is variable, and can chosen based upon a variety of factors including optimum processing time for a given group size, overall NVRAM log size, and the like.

Figure 6:
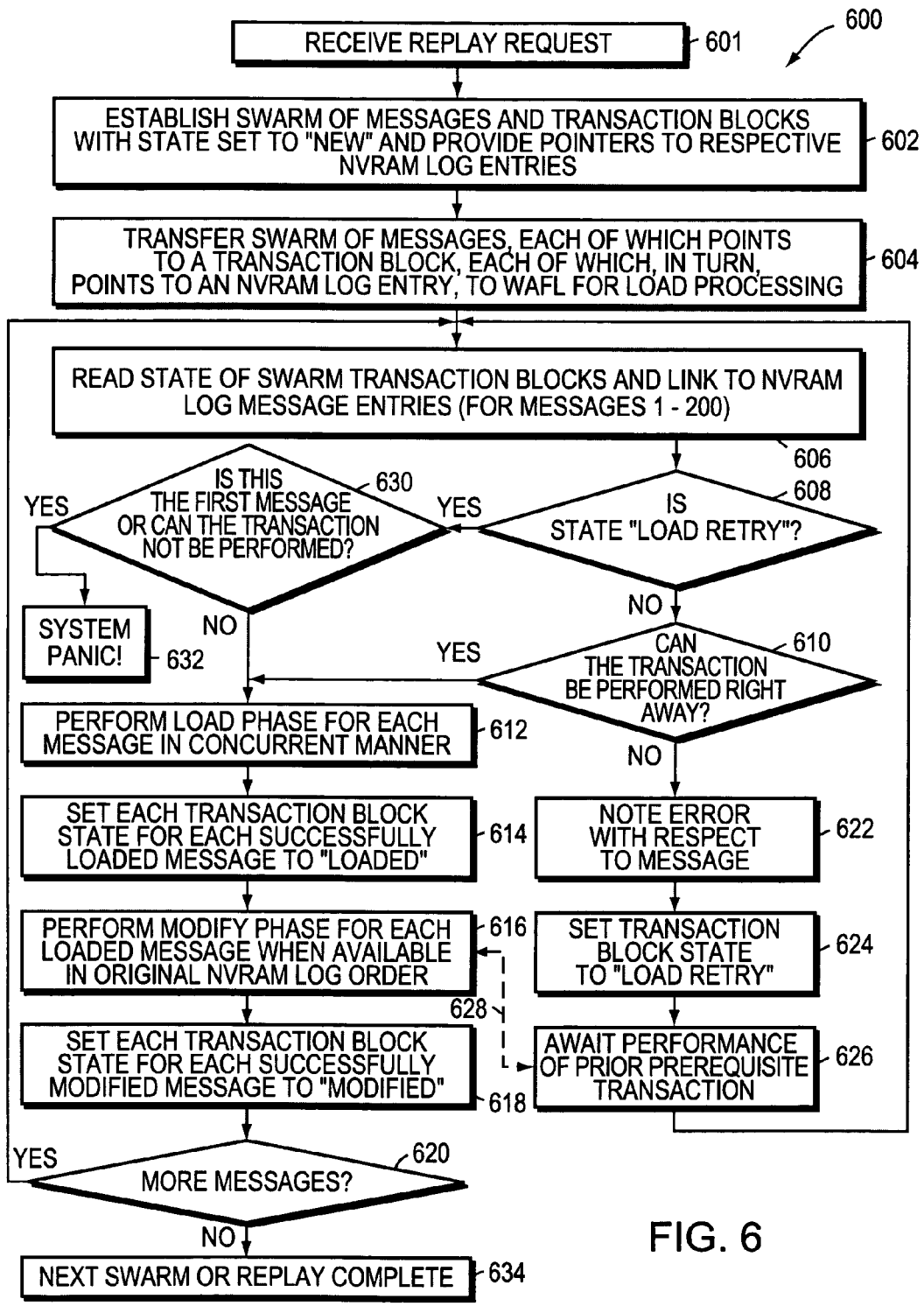
FIG. 6 is a flowchart illustrating the sequence of steps involved with handling of a swarm of messages in accordance with the present invention.

Referring also to FIG. 6, a generalized procedure 600 for handling the message swarm of FIG. 5 is shown for the respective LOAD and MODIFY phases of the file system. The procedure 600 begins after a replay request is issued by the file system due to a power failure or other interruption (step 601). At this time, the filer's normal runtime file service is suspended. An initiator process accesses the NVRAM log and reads the log header to determine the entry count 408. The initiator process establishes transaction blocks 502 mapped to each of the messages identified as part of the initial swarm. In this example, 200 messages are so-identified and mapped. The transaction blocks are each provided with a "state" set to "NEW," indicating that the transaction block is being transferred to WAFL for the first time, and no phase (e.g. LOAD, MODIFY, etc) has been entered into or attempted by WAFL with respect to that particular transaction (step 602). The messages are then transmitted to WAFL as a swarm in accordance with step 604. WAFL then begins to process the transactions through the LOAD phase using a LOAD process. The LOAD phase occurs in a somewhat-arbitrary order, with transaction request entries being processed concurrently (e.g. without regard to the original NVRAM log entry order and with a plurality of transactions processed in parallel).

Briefly, the term "LOAD" is used herein to describe the generalized process whereby meta-data and data relating to a given file on disk is retrieved by the file system for subsequent read and/or modification. This term should be taken broadly to define any retrieval of information (example—meta-data and data) from disk storage as part of a file system operation involving subsequent update and/or modification of such information on disk. The LOAD phase, and other processes are carried out by the filer's processor (or multi-processors) under direction of the file system software.

A multiplicity of steps are undertaken to complete the LOAD phase with respect to each message for each file. Where a single processor is employed, the parallel (or "parallelized") transfer and processing of a swarm of messages means that the various steps of each discrete LOAD (with respect to a given message/file) are carried out (e.g. "interleaving" of processes) in a commingled manner without regard to the underlying order of the replayed log or received messages. In other words, where each swarm message LOAD (A-C) requires ten discrete steps (1-10), the processor may carry out (for example) A-2, followed by B-2, followed by C-2, followed by C-3, followed by A-3, each occurring as soon as the processor is ready for the next task, and so on, until complete. According to this interleaved approach, multiple steps in the same message (C-2, C-3 for example) can be accomplished before the next message is "worked on" (example A-3). This contrasts with the prior approach of carrying out A-1 to A-10, before transferring and processing B-1 to B-10. This serves to provide a significant boost in overall LOAD speed. It follows that, where multiple processors are employed, the various LOAD steps of A, B and C can be simultaneously processed. However, the terms "concurrent," "parallel" and "parallelized" should be taken broadly to include both the single and multiple-processor LOAD phase environments described herein. According to step 606, each swarm transaction block state is read. The reading is accomplished in parallel as described above, so as to increase the efficient use of buffer cache and disk resources, similar to a runtime operation. The reading operation includes a link (via the block pointer) to the actual log entry, which includes the request and the applicable file handle. For any given transaction the decision step 608 is applied, in which the procedure checks if the current state is a "LOAD RETRY." This state is described in further detail below. If the current state is, in fact, NEW, then the decision block branches to decision step 610.

According to decision step 610, the procedure checks the current state to determine whether the LOAD phase of a requested transaction can be performed right away. This involves a query of the file handle associated with the requested transaction to determine whether the file may be acted upon or is created. As described above, certain operations on a file (such as a write) cannot be performed before prior prerequisite transactions (such as a create) have occurred. If the requested transaction can be accomplished presently, the procedure completes the LOAD phase (step 612) with respect to that message and associated file, and the initiator then changes the respective transaction block state from NEW to "LOADED" (step 614).

As each message is successfully loaded, its transaction block is returned to the initiator for state change. The return of LOAD phase transaction blocks to the initiator process, after being loaded by WAFL, indicates that they are now ready for the subsequent LOCK, MODIFY and RESIZE phases. Each loaded message block is sent back to WAFL at a specific time for the subsequent phase(s). This time depends specifically upon its associated message's original order within the NVRAM log. Even though the LOAD phase for a large number of log entries can occur concurrently (in parallel by the interleaving process), the LOCK, MODIFY and RESIZE phases for each transaction must occur in an order that matches the original entry order in the NVRAM log. In other words (for example), given sequential log entries A, B and C, C may be completed and returned from LOAD first, but must still await load and modification of A and B before C is itself modified.

As described above, LOCK and RESIZE are typically optional phases that do not apply to all messages. However, the MODIFY generally applies to all messages, and is therefore described in detail herein. It can be assumed that the LOCK and/or RESIZE phases are performed upon each message (as applicable) at the same time as the MODIFY phase is performed. Accordingly, when a loaded message is ready for the MODIFY phase, with all previous log entries having been modified, that message is then modified by WAFL (step 616). Each message that completes the MODIFY phase has its transaction block set to "MODIFIED" by the initiator upon return from WAFL (step 618).

According to decision step 620, the procedure attempts to process further transactions within the swarm ("more messages"). Steps 606 et seq. continue until all messages in a swarm are loaded and modified.

Referring again to decision step 610, if the procedure determines that a given transaction cannot be performed presently (e.g. a requested file write having no prior file create), then an error is noted in WAFL with respect to the file handle associated with the specific transaction (step 622). This possibility arises since messages may be loaded in an order different from the original entry order in the NVRAM log (which should rule out the possibility of an improper ordering of transactions). The transaction block state for the erroneous message is accordingly set from NEW to "LOAD RETRY" (step 624) as a result of the error. This block is then returned from WAFL to the initiator. A transaction block marked with the LOAD RETRY state indicates that the subject transaction must await the performance of a prior prerequisite transaction (related to the subject transaction's file handle) before the subject transaction can be completed (step 626). A LOAD RETRY operation is, in essence, an attempt to retransmit the transaction block for an underlying NVRAM request entry to WAFL at a time that is appropriate for completion of the LOAD thereon. In this embodiment, the LOAD of the LOAD RETRY message is attempted directly after the prior requisite transaction has been completed (e.g. when the prerequisite transaction has completed both the LOAD and MODIFY phases in accordance with steps 612-618). The dashed branch line 628 between steps 616 and 626 symbolically indicates the action of the initiator to reattempt the load when the prerequisite transaction has been completed. The LOAD RETRY message is then processed in accordance with steps 606 et seq.

When a LOAD RETRY transaction is transmitted by the initiator to WAFL, it should be capable of immediate processing, since retransmission does not occur until completion of all phases for the prerequisite transaction. As a LOAD RETRY message is recognized by WAFL, the decision step 608 branches to decision step 630. If the transmitted LOAD RETRY message is the first message, then a significant file system error is present, as the first message should not be LOAD RETRY. As such, the decision step 630 generates a system panic condition (step 632), and appropriate system administrators are notified. In addition, when system panic occurs, log replay ceases and a system reboot, or other intervention, is called for. A panic condition can also cause an appropriate flag to be set so that, upon reboot of the system, the replay occurs in a conventional synchronous manner, without the swarm-transfer of messages in accordance with this invention.

Conversely, if the transmitted LOAD RETRY message is not the first message, then decision block 630 branches to the previously described LOAD step 612, so that the above-described LOAD and MODIFY procedure (steps 614-620) can occur with respect to the subject LOAD RETRY message.

To briefly summarize, when the LOAD phase completes for each message corresponding to an NVRAM log entry (in a somewhat arbitrary order due to interleaved processing of the messages in parallel), the message is then sent to the WAFL process for the MODIFY phase in the original log order. Once the MODIFY phase completes for each message, the next entry in the NVRAM log is transferred for its respective MODIFY phase (assuming it has already completed its LOAD phase). If the transaction for the next entry has been marked LOAD RETRY (because it was unable to complete its LOAD phase), then the transaction is resent to the WAFL process after a prerequisite transaction is completed. If the LOAD phase is then unable to complete, then this indicates an error in the file system, and results in a system panic. After a swarm is complete, the next swarm (if any) is then sent.

Once the MODIFY phase has been completed for an entire swarm, the decision step 620 branches to step 634, in which the next swarm is established, and the underlying transactions for the next swarm are processed in accordance with the general procedure 600. The procedure 600 repeats, swarm-by-swarm, until the entire log has been replayed. After all messages are replayed, the memory is committed to disk via the CP process (at the CP), and normal filer service can resume.

The foregoing has been a detailed description of a preferred embodiment of the invention. Various modifications and additions can be made without departing from the spirit and scope of the invention. For example the WAFL process can be substituted with a different file system process according to an alternate embodiment of this invention. Likewise, the size and organization of the swarm can be varied. In addition, the ordering of MODIFY and LOAD RETRY processes, within the overall sequence of procedure steps, can be varied. Particularly, in an alternate embodiment, the entire initial load phase can be accomplished (except for LOAD RETRY operations) before MODIFY phases occur. The teachings of this invention can be adapted to a variety of storage system architectures including, but not limited to, a network-attached storage environment, a storage area network and disk assembly directly-attached to a client/host computer. The term "storage system" should therefore be taken broadly to include such arrangements. It is expressly contemplated that the various processes, architectures and procedures described herein can be implemented in hardware, firmware or software, consisting of a computer-readable medium including program instructions that perform a series of steps. Finally, the terms "parallel," "concurrent" and "parallelized" should be taken broadly to define processes using a single "uniprocessor" in a storage appliance that carries out interleaved message load of disk information, a uniprocessor that carries out simultaneous multiple threads of execution of processes (on each of a plurality of messages) or parallel processors. Accordingly this description is meant to be taken only by way of example and not to otherwise limit the scope of the invention.

What is claimed is:

1. A system for replay of a backup memory in a storage system having a file system for managing transfer of data to and from an attached disk array, the system comprising:

a log in the backup memory containing the storage system transaction entries accumulated after a consistency point at which time results of the storage system transaction entries are committed to the disk array;

an initiator process that establishes a swarm of messages with respect to the storage system transaction entries and delivers the swarm to the file system; and a parallel disk information-retrieval process in the file system that is carried out in an arbitrary order on the swarm of messages in parallel by a processor within the storage system, wherein the processor commingles steps of each message to process the messages in parallel.

2. The system as set forth in claim 1 wherein each of the messages of the swarm is identified by a transaction block including a pointer to one of the transaction request entries in the log, respectively, and a state that indicates whether each of the messages is one of (a) newly transferred to the file system, (b) subject to completion of a LOAD phase thereon by the disk information-retrieval process, (c) subject to completion of a MODIFY phase thereon by a MODIFY process of the file system or (d) incapable of being subject to the LOAD phase until a prerequisite event occurs.

3. The system as set forth in claim 2 wherein the prerequisite event is completion of the LOAD phase and a MODIFY phase with respect to another of the messages.

4. The system as set forth in claim 3 wherein the initiator process is adapted to retransfer each of the messages incapable of being subject to a load phase until the prerequisite event occurs to the file system for completion of the LOAD phase after the prerequisite event occurs, respectively.

5. The system as set forth in claim 4 wherein the initiator is adapted to establish a skip state with respect to skipped messages for which a portion of the disk array associated therewith is unavailable, the skip state thereby omitting the skipped messages from the swarm.

6. The system as set forth in claim 4 wherein the file system includes a panic state adapted to alert an operator if a first message received from the initiator in the swarm is a message incapable of being subject to a load phase until a prerequisite event occurs.

7. The system as set forth in claim 4 wherein the file system includes a panic state adapted to alert an operator if a message retransferred by the initiator process is a message incapable of being subject to a load phase until a prerequisite event occurs.

8. The system as set forth in claim 1 wherein the backup memory comprises a non-volatile random access memory (NVRAM).

9. The system as set forth in claim 1 wherein the storage system comprises a network storage appliance.

10. A system for replay of a backup memory in a storage system having an operating system for managing transfer of data to and from an attached disk array, the system comprising:

a log in the backup memory containing the storage system transaction entries accumulated after a consistency point at which time results of the storage system transaction entries are committed to the disk array;

an initiator process that establishes a plurality of messages with respect to the storage system transaction entries and delivers the plurality of messages to the operating system; and a parallel disk information-retrieval process in the operating system that is carried out in an arbitrary order to load the plurality of messages in parallel, where a processor commingles steps of each message of the plurality of messages.

\* \* \* \* \*